May 19, 1964     J. E. GUNNERSON     3,133,748
RESILIENT MOUNTING FOR BICYCLE REAR WHEEL
Filed Aug. 31, 1962
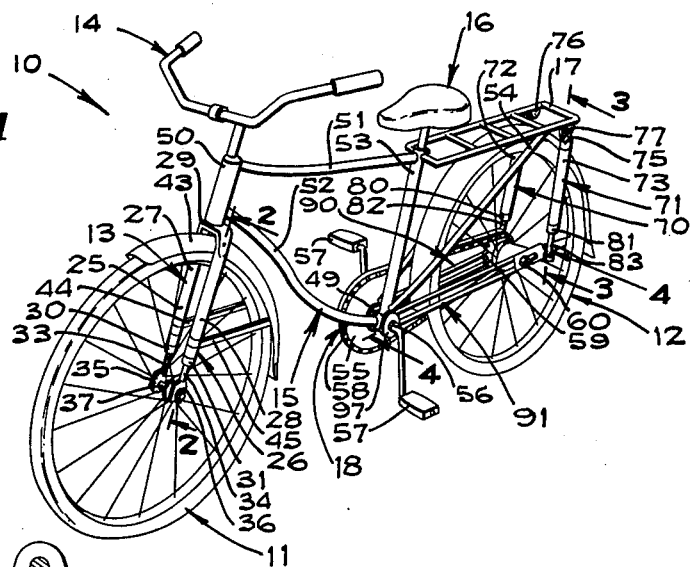
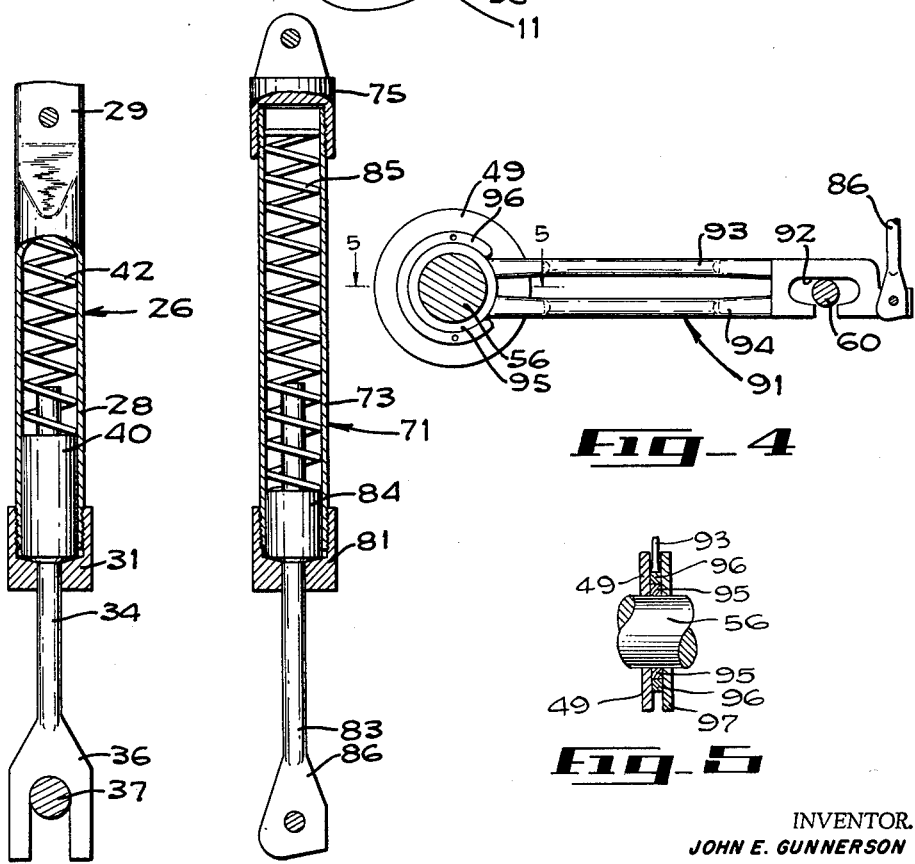
INVENTOR.
JOHN E. GUNNERSON
BY Jack M. Wiseman
ATTORNEY

3,133,748
RESILIENT MOUNTING FOR BICYCLE REAR WHEEL
John E. Gunnerson, 303 Orchard Road, Rio Dell, Calif.
Filed Aug. 31, 1962, Ser. No. 220,799
2 Claims. (Cl. 280—284)

The present invention relates in general to bicycles, and more particularly to a bicycle with shock absorbers.

An object of the present invention is to provide a bicycle that lends itself to smooth rides.

Another object of the present invention is to provide a bicycle wherein bumps from uneven riding surfaces are absorbed by the bicycle to give the rider a smoother ride.

Another object is to provide a bicycle that reduces the wear on the tires thereof.

Other and further objects and advantages of the present invention will be apparent to one skilled in the art from the following description taken in conjunction with the accompanying drawings in which:

FIG. 1 is a perspective view of a bicycle embodying the present invention.

FIG. 2 is an enlarged vertical sectional view taken along line 2—2 of FIG. 1 to illustrate a shock absorber for the forward portion of the bicycle.

FIG. 3 is an enlarged vertical sectional view taken along line 3—3 of FIG. 1 to show a shock absorber for the rearward portion of the bicycle.

FIG. 4 is an enlarged front elevational view partly in section taken along line 4—4 of FIG. 1 of linkage interconnecting a shock absorber located at the rearward portion of the bicycle with the drive sprocket mechanism for the bicycle.

FIG. 5 is an enlarged fragmentary longitudinal sectional view taken along line 5—5 of FIG. 4.

Illustrated in FIG. 1 is a bicycle 10 embodying the present invention, which comprises a front wheel 11 and a rear wheel 12. Supported by the front wheel 11 is a fork or a bifurcated steering post 13. A handle bar 14 is fixed to the fork 13 for turning the front wheel 11 in the desired direction of travel to steer the bicycle 10.

Supported by the rear wheel 12 and the fork 13 is a frame 15. A seat or saddle 16 is mounted on the frame 15 spaced from the handle bar 14. Forming a part of the frame 15 is a luggage carrier 17. Carried by the frame 15 is a sprocket drive mechanism 18 which is operated by foot pedals to propel the rear wheel 12 and the bicycle 10.

According to the present invention, the bifurcated steering post or fork 13 includes a pair of laterally spaced, spring loaded shock absorbers 25 and 26 (FIG. 1). The shock absorbers 25 and 26 are similar in structure and operate in the same manner. In FIG. 2, the shock absorber 26 is shown in detail.

The shock absorbers 25 and 26 comprise cylindrical casings or cylinders 27 and 28, respectively. At the upper portions thereof, the cylinders 27 and 28 may be secured by nuts and bolts to the lower extremity of spaced ears connecting member 29 for the fork 13 or may be integrally formed therewith. At the lower portions of the casings 27 and 28 are secured caps 30 and 31, respectively, by threaded engagement.

Received by central openings in the caps 30 and 31 are rods 33 and 34, respectively. Integrally formed with the rods 33 and 34 are bifurcated or forked ends 35 and 36, respectively, which receive an axle 37 of the front wheel 11 for free rotation. Suitable nuts retain the rod ends 35 and 36 in position to be supported by the axle 37.

At the upper portion of the rods 33 and 34 are located plungers, such as plunger 40 (FIG. 2) for the rod 34, which engage the free lower portions of springs, individually, such as spring 42 (FIG. 2). The plungers and springs are disposed within their associated casing with the upper portion of the spring abutting against and anchored to the upper section of its associated casing. A front fender 43 for the wheel 11 is attached to the fork 13 and has arms 44 and 45 attached to the shock absorbers 25 and 26, respectively.

From the foregoing, it is to be observed that should the front wheel 11 ride on an uneven surface or encounter an obstacle, the spring loaded shock absorbers 25 and 26 will absorb the shock to dampen or reduce the vibratory movement of the handle bar 14 and the frame 15. Hence, the shock absorbers 26 and 25 tend to provide a smoother ride for the bicycle rider.

The frame 15 includes a tubular bearing sleeve 50 (FIG. 1) that receives the handle bar 14 and the fork 13 for rotation therein. Extending rearwardly from the upper portion of the sleeve 50 is a rod 51. Below the rod 51 is a diagonal or bent rod 52, which extends rearwardly from the lower portion of the sleeve 50. The rods 51 and 52 terminate at an upright rod 53, which has the seat 16 adjustably attached thereto.

The luggage carrier 17 is part of the frame 15 and extends rearwardly therefrom. Joining the rearwards portion of the luggage carrier 17 and the lower portion of the upright rod 53 is a diagonal rod 54. At the junction of the upright rod 53, the arcuate rod 52, and the diagonal rod 54 is disposed the sprocket drive mechanism 18.

As shown in FIG. 1, the drive mechanism 18 includes a drive sprocket 55 that rotates with a drive shaft 56. The drive shaft 56 is freely rotatable within a bearing sleeve 49. Pedals 57 impart rotary movement to the shaft 56, which, in turn, rotates the drive sprocket 55. Trained around the drive sprocket 55 is a chain 58, which transmits a rotary movement to a driven sprocket 59. The driven sprocket 59 imparts rotation to the rear wheel 12 about an axle 60 to propel the bicycle 10.

According to the present invention, a pair of laterally spaced, spring loaded upright shock absorbers 70 and 71 project downwardly from the rear portion of the frame 15 and particularly the luggage carrier 17. The shock absorbers 70 and 71 are similar in structure and operate in the same manner. In FIG. 3, the shock absorber 71 is shown in detail.

The shock absorbers 70 and 71 comprise cylindrical casing or cylinders 72 and 73, respectively. Attached to the upper portion of the cylinders 72 and 73 by threaded engagement are caps such as cap 75 in FIGS. 1 and 3. The caps 75 are secured by nuts and bolts to depending, laterally spaced ears 76 and 77, respectively, of the luggage carrier 17.

At the lower portions of the cylinders 72 and 73 are secured by threaded engagement caps 80 and 81, respectively. Received by the central openings in the caps 80 and 81 are rods 82 and 83, respectively. At the upper portions of the rods 82 and 83 are plungers, such as plunger 84 (FIG. 3). The plungers for the rods 82 and 83 engage individually the free lower portions of springs, such as spring 85 (FIG. 3). The plungers and springs are disposed within their associated casing with the upper portion of the spring abutting against and anchored to the upper section of its associated casing.

Integrally formed with the lowermost portion of the rods 82 and 83 are fastening projections, such as projection 86 of FIG. 3. Disposed between the drive sprocket mechanism 18 and the fastening projections of the rods 82 and 83 are laterally spaced, substantially horizontal links 90 and 91 (FIGS. 1 and 4). The links 90 and 91 are similar in structure and operate in the same manner. In FIG. 4 an enlarged illustration of the link 91 is shown.

The links 90 and 91 individually comprise a centrally located section having a pair of vertically spaced tubes, such as vertically spaced tubes 93 and 94, (FIG. 4) of link 91. The rearward section of the link 90 and 91 include slots, such as slot 92 of FIG. 4, which receive opposite ends of the axle 60 to be supported thereby. Attached to the rearmost portions of the link 90 and 91 by nuts and bolts are the fastening projections, such as the projection 86 (FIG. 3) of the rods 82 and 83, respectively, of the shock absorbers 70 and 71, respectively.

At the forwardmost portion of the links 90 and 91 are located rings, such as ring 95 (FIG. 4) of the link 91. The rings of the links 90 and 91 receive the drive shaft 56 and permit free rotation thereof. In addition, the rings of the links 90 and 91 are in abutting contact with opposite end walls of the bearing sleeve 49. Encircling a portion of each ring of the links 90 and 91 is an arcuate filler, such as arcuate filler 96 (FIG. 4) for the link 91. Facing each end wall of the bearing sleeve 49 with the ring and the arcuate filler disposed therebetween is a cap disc 97 (only one being shown in FIG. 1). Suitable nuts and bolts which are received by the end wall of the sleeve 49, the filler 96 and the cap disc 97 retain the forward end of the associated links in position and secured axially relative to the drive shaft 56 but permitting pivotal movement relative thereto.

It is to be noted that should the wheel 12 of the bicycle 10 encounter an obstacle or ride on an uneven surface, the spring loaded shock absorbers 70 and 71 will absorb the shock to dampen or reduce the vibratory movement of the frame 15 and particularly the rearward portion of the bicycle 10. Hence, the shock absorbers 70 and 71 tend to provide a smoother ride for the bicycle rider.

In the operation of the bicycle 10, an operator sits on the saddle 16 and grips the handle bar 14. The pedals 57 are actuated by the feed of the operator to propel the bicycle 10. If the front wheel 11 encounters an obstacle or engages an uneven surface, the shock absorbers 26 and 25 by means of the springs and rods thereof dampen, reduce and absorb vibratory motion so as to maintain the forward end of the frame 15 and the handle bar 14 relatively free of excessive vibrations and jarring.

Should the rear wheel 12 of the bicycle 10 encounter an obstacle or engage an uneven surface, the shock absorbers 70 and 71 by means of the springs and rods thereof dampen, reduce and absorb vibratory motion transmitted by way of or through the links 90 and 91. In this manner, the frame 15 and particularly the rearward portion thereof is maintained relatively free of excessive vibrations and jarring.

It is to be understood that modifications and variations of the embodiment of the invention disclosed herein may be resorted to without departing from the spirit of the invention and the scope of the appended claims.

Having thus described my invention, what I claim as new and desire to protect by Letters Patent:

1. A bicycle comprising a front wheel, a rear wheel spaced from said front wheel, a frame carried by said front and rear wheels, said frame being formed with a sleeve, said frame being formed with a generally upright post extending upwardly from said sleeve, a drive shaft received by said sleeve, a sprocket fixed to said shaft for rotation therewith, a chain trained around said sprocket and connected to said rear wheel for rotating said rear wheel, an axle for said rear wheel, a pair of laterally spaced links carried by said axle for movement therewith and supported by said drive shaft for pivotal movement, said frame including a rearward portion extending from said upright post and disposed above said rear wheel in substantially parallel relation with said spaced links, generally upright shock absorbers extending from said frame to said links for lessening any jarring motion transmitted toward said frame by way of said rear wheel, and a diagonal bar extending from said sleeve to said rearward portion of said frame adjacent to said shock absorbers.

2. A frame for a bicycle comprising an upright sleeve, a horizontal rod extending rearwardly from on upper portion of said upright sleeve, a diagonal rod extending rearwardly from a lower portion of said upright sleeve, an upright rod joining the rearward ends of said horizontal and diagonal rods, a horizontal sleeve disposed at the junction between said diagonal and upright rods, a luggage carrier extending rearwardly from an upper portion of said upright rod, a diagonal rod extending between said horizontal sleeve and a rearward portion of said luggage carrier, horizontal links extending horizontally from said horizontal sleeve, and shock absorbers connected to said luggage carrier and said horizontal links.

References Cited in the file of this patent

UNITED STATES PATENTS

| | | |
|---|---|---|
| 902,920 | Silva | Nov. 3, 1908 |
| 1,142,344 | Mackey | June 8, 1915 |
| 1,171,371 | Wagner | Feb. 8, 1916 |
| 2,078,213 | Martin | Apr. 20, 1937 |
| 2,475,774 | Benson | July 12, 1949 |
| 2,670,218 | Rokahr | Feb. 23, 1954 |

FOREIGN PATENTS

| | | |
|---|---|---|
| 102,392 | Great Britain | Dec. 7, 1916 |
| 452,082 | Italy | Oct. 6, 1949 |
| 500,714 | Italy | Nov. 20, 1954 |